Patented July 5, 1949

2,474,896

UNITED STATES PATENT OFFICE 2,474,896

SOLUTIONS OF VINYLIDENE CHLORIDE-ACRYLONITRILE COPOLYMERS CONTAINING AN AROMATIC HYDROCARBON AS A GEL RETARDANT

Paul Matthew Hauser, Kenmore, N. Y., assignor to E. I. du Pont de Nemours & Company, Wilmington, Del., a corporation of Delaware No Drawing. Application April 19, 1946, Serial No. 663,628

3 Claims. (Cl. 260—32.8)

1

This invention relates to coating compositions and more particularly to gel resistant solutions of vinylidene chloride-acrylonitrile copolymers suitable for coating transparent, non-fibrous, synthetic film such as regenerated cellulose sheets and the like.

Flexible, transparent film or coatings formed from methyl ethyl ketone solutions of copolymers of vinylidene chloride and acrylonitrile wherein the weight ratio of vinylidene chloride to acrylonitrile is at least 4:1 are of exceptionally high moisture resistance, and are heat-sealable at moderately low temperatures and hence are particularly suitable for the coating of transparent, non-fibrous, synthetic film such as regenerated cellulose film and the like to produce moisture-proof, heat-sealable wrapping tissue, etc. The difficulty, however, with the aforesaid solutions is that they gel rapidly at temperatures below 60° C. and this behavior makes coating in conventional equipment very difficult since gelled solutions cannot be doctored readily into smooth continuous coatings.

Therefore, an object of this invention is to provide means for inhibiting the gelation and improving the coatability of methyl ethyl ketone solutions of vinylidene chloride-acrylonitrile copolymers wherein the vinylidene chloride content is at least 90% by weight.

Another object is to provide methyl ethyl ketone solutions of vinylidene chloride-acrylonitrile copolymers wherein the vinylidene chloride content is at least 90% by weight, which solutions are resistant to gelling at temperatures below 60° C.

A still further object is to provide a methyl ethyl ketone solution of vinylidene chloride-acrylonitrile copolymer wherein the vinylidene chloride content is at least 90% by weight, which solutions can be applied to regenerated cellulose and the like in conventional coating systems operated at normal temperatures. These and additional objectives will more clearly appear hereinafter.

Unexpectedly, I have found that if a small amount of an aromatic hydrocarbon or mixture of aromatic hydrocarbons is incorporated in the methyl ethyl ketone solution of vinylidene chloride-acrylonitrile interpolymer wherein the proportion by weight of vinylidene chloride to acrylo-

2 nitrile is at least 4:1, the tendency of said solution to gel at temperatures below 60° C. is retarded to the point where it is usable in conventional coating systems without the need for altering the conditions of operation in any respect.

The preparation of methyl ethyl ketone-soluble copolymers of vinylidene chloride and acrylonitrile wherein the weight ratio of vinylidene chloride to acrylonitrile is at least 4:1, is described and claimed in the copending U. S. patent application of Chester R. Hardt, Serial No. 605,185, July 14, 1945, now abandoned. Methyl ethyl ketone solubility is achieved in accordance with said disclosure by effecting the copolymerization of vinylidene chloride and acrylonitrile, in any convenient manner, in the presence of a small amount of modifier of the formula

wherein R and R' may each be hydrogen or a hydrocarbon group.

Any aromatic hydrocarbon is useful for purposes of my invention. As representative compounds there may be mentioned benzene, toluene, xylene, trimethyl benzene, triethyl benzene, naphthalene, anthracene, phenanthracene, etc. However, because of its ready availability and effectiveness, toluene is the preferred gel-retardant. The amount of aromatic hydrocarbon employed may vary within wide limits, but it should not, of course, be used in amounts which would interfere with the desirable solvent action of the methyl ethyl ketone. Amounts as small as 2% based on the weight of total solvents effectively retard gelation of the solvent. Preferably the gel retardants of this invention should be used in amounts within the range of 10% to 20% by weight based on the weight of total solvent.

As indicated previously, the improved coating compositions of my invention can be applied by any conventional means and at temperatures which normally obtain in the conventional coating systems.

The following examples, wherein are set forth specific embodiments, further illustrate my invention. Parts and percentages are by weight unless otherwise indicated.

Example I

Solutions of vinylidene chloride-acrylonitrile copolymer (90% vinylidene chloride, 10% acrylonitrile) were made up by dissolving 15% solids (i. e., copolymer) in methyl ethyl ketone admixed with various gel retardants in amounts indicated below and the gel time of each solution at 25° C. was observed as follows:

| Gel Retardant | Gel Retardant | Gel Time 25° C. |
|---|---|---|
|  | Per cent | Minutes |
| None | | 20 |
| Benzene | 20 | 60 |
| Toluene | 20 | >90 |
| Xylene | 10 | 60 |

Gel time is defined as the time before sufficient gelation of a freshly prepared solution occurs to prevent pouring from a test tube.

Example II

A composition consisting of:

| | Parts |
|---|---|
| 90–10 vinylidene chloride-acrylonitrile copolymer | 12 |
| Toluene | 8.8 |
| Methyl ethyl ketone | 79.2 | was coated on regenerated cellulose film in a coating tower at 30° C. There was no indication of gelation after 10 minutes. A continuous, clear, moisture-impermeable coating was produced.

In contrast, a coating composition identical with the above save that toluene was replaced with methyl ethyl ketone was applied to regenerated cellulose film in the same way. A discontinuous moisture-permeable coating resulted. The coating composition gelled rapidly even at 50° C.

Example III

A composition consisting of:

| | Parts |
|---|---|
| 90-10 vinylidene chloride-acrylonitrile copolymer | 15 |
| Benzene | 5 |
| Methyl ethyl ketone | 95 | was coated on regenerated cellulose film as in the previous example with substantially identical results.

From the above examples it will be apparent that by means of the present invention the coatability of vinylidene chloride-acrylonitrile copolymers containing at least 90% vinylidene chloride, is greatly improved and one is now enabled to employ such polymers in conventional coating systems whereby to produce clear, flexible, moisture-impermeable coated film of excellent quality. Also, self-sustaining film of vinylidene chloride-acrylonitrile copolymer may similarly be prepared by casting the solution onto a suitable surface and stripping the dried or solvent-free film therefrom as in the usual method of dry-casting.

As many widely different embodiments can be made without departing from the spirit and scope of my invention, it is to be understood that it is not restricted except as set forth in the appended claims.

I claim:

1. A film-forming composition comprising essentially a copolymer of vinylidene chloride and acrylonitrile wherein the weight ratio of vinylidene chloride to acrylonitrile is at least 4:1 and the remainder of the copolymer is acrylonitrile, dissolved in methyl ethyl ketone containing from 2 to 20% by weight of aromatic hydrocarbon to retard gelation of the composition.

2. A film-forming composition comprising essentially a copolymer of vinylidene chloride and acrylonitrile wherein the weight ratio of vinylidene chloride to acrylonitrile is at least 4:1 and the remainder of the copolymer is acrylonitrile, dissolved in a solvent mixture consisting of 80 to 90% by weight of methyl ethyl ketone and 20 to 10% by weight of aromatic hydrocarbon.

3. The composition of claim 2 wherein the aromatic hydrocarbon is toluene.

PAUL MATTHEW HAUSER.

REFERENCES CITED

The following references are of record in the file of this patent:

UNITED STATES PATENTS

| Number | Name | Date |
|---|---|---|
| 2,348,447 | Bock | May 9, 1944 |